United States Patent Office 2,993,700
Patented July 25, 1961

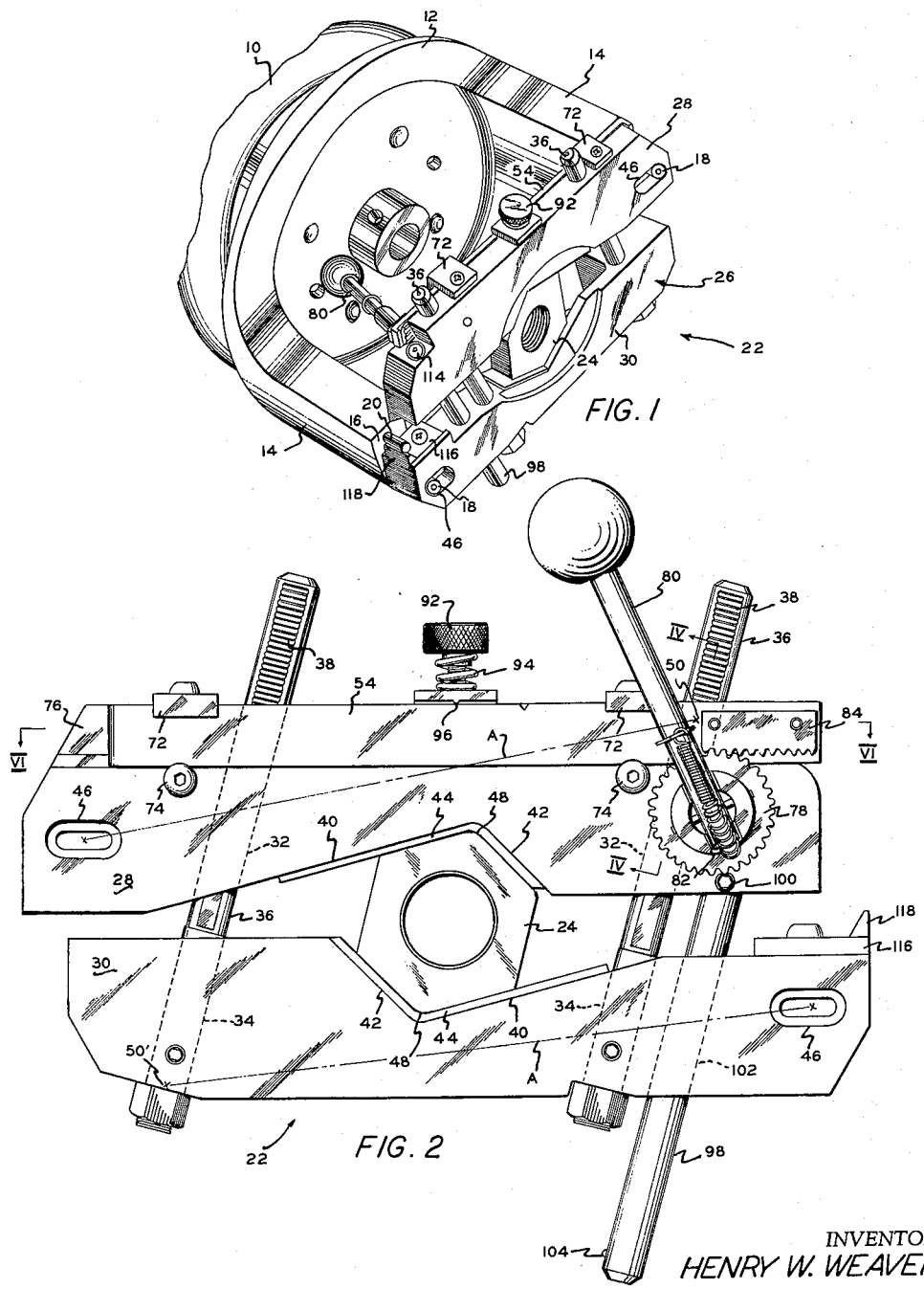

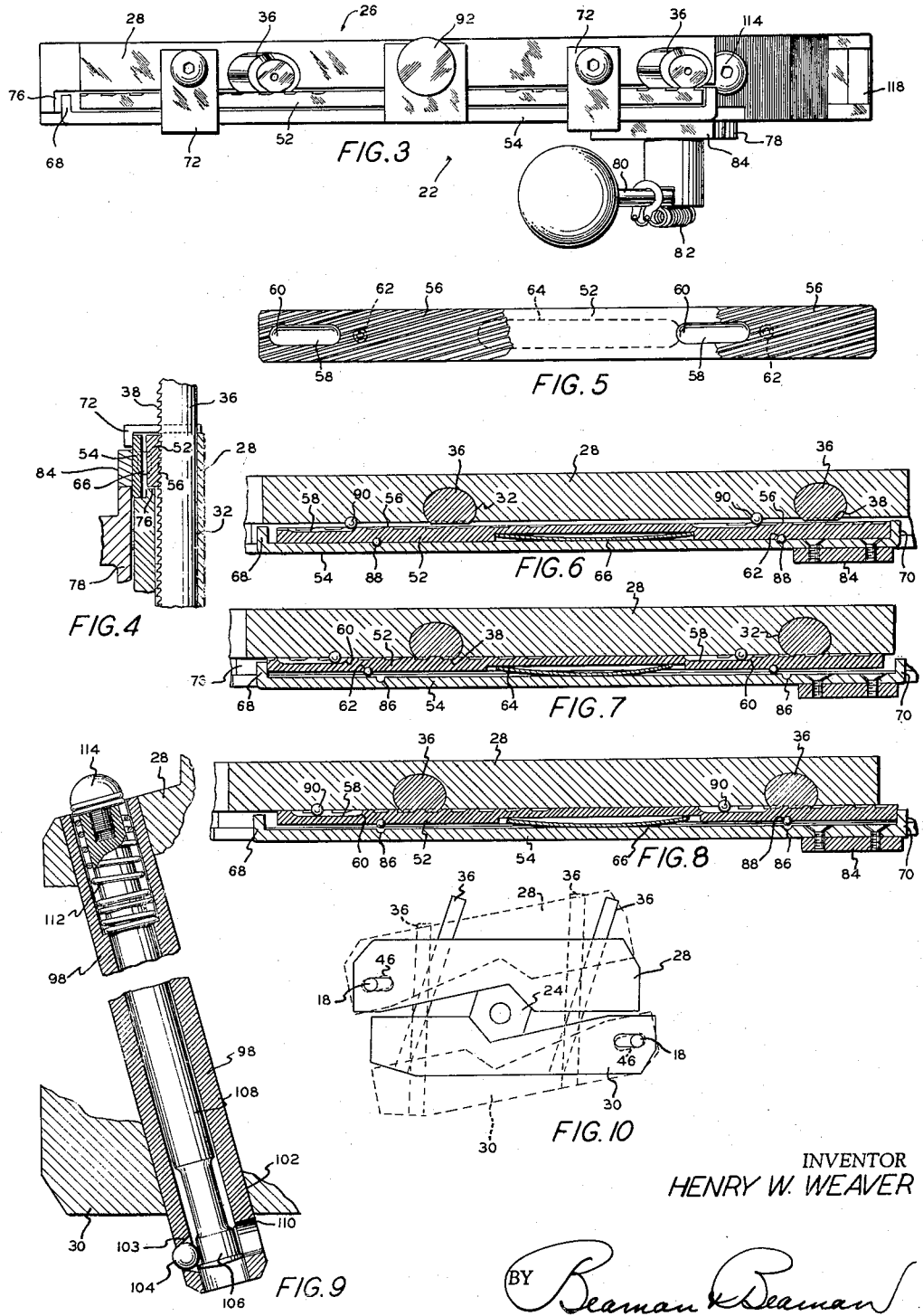

2,993,700
CHUCK
Henry W. Weaver, Clark Lake, Mich., assignor to Sparcraft, Inc., Jackson, Mich., a corporation of Michigan
Filed July 13, 1960, Ser. No. 42,554
8 Claims. (Cl. 279—1)

The invention pertains to a chuck and in particular relates to a chuck for holding members preferably having a hexagonal configuration which are rotated during threaded assembly with other threaded components.

In the conduit art, especially when using reusable end fittings with flexible hose members, it is often required that many end fittings must be assembled to hose lengths and as the end fittings are usually elements having hexagonal external configurations which are threadedly assembled and often require high torques during assembly, the assembling of the fittings is often a tedious and difficult hand operation. In those installations where a great number of reusable end fittings and hose are assembled, such as in the aircraft and missile arts, machines have been devised for gripping one component of the fitting and rotating by motor means the other component to facilitate this type of operation. The chucks employed with this type of assembling machine which are of conventional chuck design have not proven satisfactory due to the high torque requirements of the assembly and a lack of flexible operation which permits a wide variety of hexagonal configurations to be accommodated quickly. Also, known chuck configurations do not readily lend themselves to the clearances and tolerances required in assembling such threaded members and often fail, due to the stresses imposed upon the chuck components.

It is, therefore, an object of the invention to provide a chuck for the aforementioned type of machine wherein the chuck is very quickly adjusted to a wide variety of sizes, is capable of withstanding high torque forces without failure and requires no special skills on the part of the operator.

A further object of the invention is to provide a chuck of the above type comprising a pair of spaced plates interconnected by connecting rods wherein the forces imposed upon the rods are primarily in a tensioned direction and shear forces imposed on the rods are minimized.

Yet a further object of the invention is to provide a chuck of the above type which provides clearances permitting use with elbow and U fittings having hexagonal configurations and wherein the outer face thereof is free of projections that the threaded components may be brought into close proximity.

Another object of the invention is to provide a chuck of the above type which is safe in operation and will not accidently open or endanger the operator.

These and other objects of the invention arising from the structure and arrangement of a specific embodiment thereof will be apparent from the following description and accompanying drawings wherein:

FIG. 1 is a perspective view of a machine head employing a chuck in accord with the invention, FIG. 2 is an elevational backside view of the chuck in accord with the invention, FIG. 3 is a top plan view of the chuck of FIG. 2, FIG. 4 is an elevational sectional view of the cam bar and connecting rod relationship taken along section IV—IV of FIG. 2, FIG. 5 is an elevational detail view of the cam bar used with the invention, FIGS. 6 through 8 are plan sectional views showing different relationships between the cam bar and actuating member during different phases of the chuck operation as taken along section VI—VI of FIG. 2, FIG. 9 is a detailed enlarged sectional elevational view of the guide and safety rod employed with the chuck, and FIG. 10 is a schematic view of the basic chuck components wherein the components are shown accommodating small and large hexagonal configurations.

The environment in which the invention is employed is best illustrated in FIG. 1 wherein the rotating head of a hose assembling machine is shown. The head 10 is mounted upon suitable bearing and spindle structure and is rotatable by a motor, not shown. A "pot" 12 of substantially U configuration is affixed to the rotating head 10 wherein the legs 14 of the pot extend in a parallel axial direction away from the head. The outer ends of the legs 14 are provided with a surface 16 lying in a plane perpendicular to the axis of rotation and a pair of drive pins or screws 18 may be affixed to the legs into this surface. A locating pin 20 also extends from the surface 16 of one of the legs.

The chuck of the invention is generally designated at 22 and is mounted upon the pot 12 by means of the drive screws 18 and has jaw members defined thereon for maitaining a nut 24 or other member having hexagonal configurations in coaxial relationship with the rotating head 10. The machine employing the invention is also provided with a tailstock member having a chuck identical to that illustrated. However, the tailstock chuck does not rotate and grips the stationary member upon which the nut 24 is to be rotated. Means are provided for translating the tailstock chuck toward the head mounted chuck wherein during the assembly and axial movement of the tailstock member relative to the headstock gripped nut the tailstock chuck may move close to the headstock held chuck. In that the headstock and tailstock chucks will often be brought within one-eighth of an inch of each other, the outer or front face 26 of the chucks is flush, note FIG. 3.

The chuck components are best illustrated in FIGS. 1 through 3 and include a first plate member 28 and a second plate member 30 which are of generally planar configuration and are interconnected for parallel movement relative to each other as will be later apparent. The plate member 28 is provided with a pair of spaced parallel cylindrical guideways 32 extending from the top surface of the plate through the bottom surface thereof, FIG. 2. The lower plate member 30 is provided with bores 34 in which a pair of spaced parallel connecting rod members 36 are received and extend from the upper surface of the plate. The connecting rods 36 may be threaded at the lower end and provided with a nut 38 and set screws maintain the rods within the bores 34. The rods 36 are so located as to be received within the guideways 32 of the plate 28 and are formed with teeth 38 on one side thereof which extend at right angles to the rod axes, FIG. 4, for purposes which will be later apparent.

Jaw surfaces 40 and 42 are defined on the opposed portions of the plate members, e.g., the lower side of the upper plate 28 and the upper side of the lower plate 30, FIG. 2. In that the chuck will preferably grip members having hxagonal surfaces the jaw surfaces 40 and 42 are disposed at 120° relative to each other and are provided on their inner surfaces with a wear plate 44.

The driving screws 18 cooperate with shouldered elongated slots 46 formed in each plate adjacent one of the ends thereof and the purpose of the slot being elongated is to permit the chuck to be opened and closed within the operating limits. As shown in FIG. 10 the different relationships of the driving screw 18 within the slots 46 when the chuck plate members are relatively close or spaced further apart will be appreciated.

The angular relationships and positions of the connecting rods 36, jaw surfaces 40 and 42 and the elongated slots 46 are important to the improvements produced by the chuck. Upon a nut or other similar component being gripped between the plates 28 and 30 and the rotation of the entire chuck by means of the head 10 very high torque forces are imposed upon the chuck during the final tightening rotation thereof and it has been discovered that by employing the disclosed angular relationships the forces tending to separate the plate members during such high torque conditions impose primarily tension forces upon the connecting rods 36 with very little or no bending or shear forces imposed thereon. This is very important in that the connecting rods are capable of withstanding high tension forces but will bend and break if they are repeatedly subjected to high shear forces. To accomplish the desired operating characteristics, the jaw surface 40 is disposed at 15° to the horizontal and the jaw surface 42 is disposed at 45° from the horizontal, FIG. 1. The axes of the connecting rods 36 are disposed 30° from the vertical whereby the included angle between the jaw surface 40 and the axis of the adjacent connecting rod will be 60°. The elongated driving slots 46 are related to the intersection 48 of the associated jaw surfaces 40 and 42 at the wear plate such that an extension of the major axis of the slot will approximately intersect this intersection and the linear sides of the slot are parallel to this major axis. Also, as the connecting rods are attached to the associated plate adjacent the upper surface of the upper plate 28 and the lower surface of the lower plate 30, a line A, FIG. 2, drawn from the center of the driving slot 46 to the remote associated connection point 50 is substantially parallel to the jaw surface 40. This relationship is significant in that during the tightening of the components being assembled there is a lever action being imposed upon each plate member wherein the fulcrum will be adjacent the intersection 48 of the jaw surfaces and the forces imposed upon the plate member 28 at 50 and the associated slot 46 and the plate member 30 at 50' and the associated slot will tend to efficiently transmit the force to the jaw surfaces 40 and therefrom into the member gripped therebetween.

The connection preventing separation of the plate members 28 and 30 and which produces the compressive gripping force upon the member held between the jaw surfaces is accomplished by a cam bar 52 mounted upon the plate member 28 operatively associating with the connecting rod teeth 38. A cam bar actuating element 54 is associated with the cam bar and maintains the same in position upon the plate 28 as well as actuates the bar. The cam bar 52, actuating member 54, and relationships therebetween are illustrated in FIGS. 2 through 8 of the drawings. The cam bar is in elongated, rectangular form, FIG. 5, having a plurality of parallel teeth 56 formed on one side thereof. The teeth 56 are complementary in configuration to the connecting rod teeth 38 and extend in a direction parallel to the connecting rod teeth which, as mentioned above, are disposed at right angles to the axis of the connecting rods. A pair of elongated grooves 58 are defined upon the cam bar on the same side as the teeth and the left ends of the grooves, FIG. 5, are provided with cam surfaces 60 of a tapered nature for a purpose which will be later apparent. A pair of spherical recesses 62 are defined on the opposite side of the cam bar for receiving cam projection balls and a groove 64 is formed on this side to receive the leaf spring 66 interposed between the actuating element and the cam bar.

The cam bar actuating element 54 is of a rectangular configuration similar to that of the cam bar 52 and is provided with turned end flanges 68 and 70 at the ends thereof which provide stop elements for engaging the ends of the cam bar. It will be noted that the distance between the flanges 68 and 70 is greater than the length of the cam bar whereby axial longitudinal movement of the actuator element with respect to the cam bar will provide a lost motion connection between the cam bar and actuating element. Both the cam bar 52 and actuating element 54 are mounted upon the plate member 28 for longitudinal slidable movement and are maintained in position thereon by a pair of guide elements 72 affixed to the top surface of the plate projecting over and behind the cam bar actuating element, see FIGS 2 and 3. The lower portion of the actuating element is maintained upon the plate member 28 by a pair of headed screws 74, FIG. 2, and it will be appreciated that the guides 72 and screws 74 and the recessed portion 76 of the plate member 28 which receives the cam bar associating with the ends of the actuating elements, FIG. 3, define a guideway in which the cam bar and actuating element may be longitudinally shifted relative to the plate member.

The cutout recess 76 of the plate member 28 intersects the guideways 32 receiving the connection rods 36 such that the teeth 38 of the connecting rods project into the cutout recessed plate portion and, hence, may be engaged by the teeth 56 of the cam bar element 52.

A pinion gear 78 is rotatably mounted upon the back side of the plate member 28 and a handle 80 is affixed thereto on a pivotal connection whereby the handle, under the influence of a spring 82, may be biased to a position substantially coaxial with the gear, see FIG. 1, and may be moved to a right angle position during rotation of the gear by the handle, as in FIGS. 2 and 3. A gear rack 84 is affixed to the cam bar actuating member, FIG. 2, in mesh with the gear 78 whereby rotation of the gear wheel by means of the handle 80 will longitudinally shift the actuating element in the decided direction. The purpose of the pivotal handle 80 is to insure that the handle will be pivoted to a safe position during rotation of the chuck and during rotation of the chuck, the handle will be located within the confines of the pot 12, as shown in FIG. 1.

As shown in FIGS. 6 through 8, the inner surface of the cam bar actuating element 54 adjacent the cam bar 52 is provided with a pair of spherical recesses 86 spaced a distance apart equal to that of the recesses 62 of the cam bar in which a ball element 88 is located. Ball elements 90 are also located within the cutout recess portion 76 of the plate member 28 and coact with the cam bar grooves 58 and cam surfaces 60 thereof as will be appreciated hereinafter.

In operation, the handle 80 and gear 78 are rotated to shift the cam bar actuating element 54 to the left, FIG. 2, as far as possible. This operation will locate the cam bar and actuating element as shown in FIG. 6 wherein the flange 70 will abut the right end of the cam bar and shift the same to its leftmost position such that the balls 90 will engage the cam surfaces 60 and force the cam bar 52 away from the connecting rods 36 and into tight engagement with the actuator element 54. Such action is possible in that the recesses 86 of the actuator element are in alignment with the balls 88 mounted within the cam bar and at this position it will be appreciated that the teeth 56 of the cam bar are out of engagement with the connecting rod teeth 38. The operator may now grasp the plate members 28 and 30 and by pivoting the same about the drive screws 18 the plates may be moved toward or away from each other to accommodate the desired sized nut or component to be gripped between the plate jaw surfaces, FIG. 10. Upon locating the nut as desired, the operator will then close the plates upon the nut manually as far as possible at which position the hexagonal surfaces of the nut will be engaging the wear plate on the jaw surfaces 40 and 42 of the plates.

The operator then moves the handle 80 in a clockwise direction, FIG. 2, and upon doing so, the engagement of the balls 88 within the recesses 86 will shift the cam bar 52 to the right wherein the balls 90 will ride off of the cam surfaces 60 and be received within the grooves 58. As the balls 90 leave the cam surfaces 60 the leaf spring 66 will force the cam bar toward the connecting rods and the cam bar will assume the position shown in FIG. 7. Further continued movement of the actuator element 54 to the right causes the ball elements 88 to leave the recesses 86 and engage the inner surface of the cam bar actuating element. In this position, FIG. 7, the balls 88 will positively hold the teeth 56 of the cam bar in engagement with the teeth 38 of the connecting rods and as the actuating element is shifted to the right, the left flange 68 will engage the left cam bar end and cause the cam bar to shift to the right at the same rate of travel as the actuating element.

As the cam bar 52 is shifted to the right, the fact that the longitudinal direction of movement of the cam bar is angularly related to the axes of the connecting rods in the illustrated relationship will cause the chuck plates 28 and 30 to be moved toward each other and such action will tightly grip the nut 24 between the plate jaw surfaces. If one movement of the cam bar is insufficient to provide the desired gripping force the operator may rotate the gear 78 in the opposite direction and repeat the action. As the cam bar returns, the teeth 56 thereof will "ratchet" over the connecting rod teeth 36 and usually, one or two clockwise rotations of the gear 78, FIG. 2, will suffice. Upon tightening the plates to the gripped member the desired degree, the operator will release the handle 80 which will assume the position of FIG. 1 and will tighten a thumb screw 92 threaded into the plate member 28 which compresses a spring 94 forcing a plate having a projection 96 into engagement with the upper surface of the actuating element 54. Tightening of the thumb screw 92 frictionally locks the actuator element against accidental longiudinal displacement during rotation of the chuck and is a safety feature to prevent the actuating element from shifting to the left, FIG. 2, during operation of the machine.

To release the nut 24 from the chuck the thumb screw 92 is backed off and the handle 80 is rotated in a counterclockwise direction, FIG. 2, shifting the actuating element 54 to the left. The initial shifting of the actuating element to the unlocking position causes the actuating element flange 70 to engage the right end of the cam bar, FIG. 8, which aligns the recesses 86 with the ball elements 90 and further movement of the actuating element to the left releases the locking engagement of the cam bar teeth and the connecting rod teeth. The operator will continue to rotate the gear 78 until the components assume the relationship of FIG. 6 wherein the engagement of the balls 90 with the cam surfaces 60 will force the cam bar out of engagement with the connecting rod teeth and permit the operator to open the chuck as desired.

The operation and safety of the chuck is additionally improved by the use of a cylindrical guide pin 98 which is affixed to the upper plate member 28 by being received within a bore formed therein such that the upper end of the guide pin is accessible to the operator, FIG. 1, and is affixed within the plate by the set screw 100. A bore 102 within the lower plate 30 slidably receives the guide pin 98. The use of the guide pin improves the alignment of the rods 36 and guideways 32 when the plates are completely separated. Another important purpose of the guide pin 98 is to prevent complete accidental separation of the plate members and to this end, a radially movable ball element 104, FIG. 9, is located at the lower end of the pin and projects beyond the cylindrical surface thereof through a tapered hole 103 wherein the ball will prevent the pin from being pulled from the bore 102. The ball 104 is held in its operable position by a cylindrical surface 106 formed upon an axial movable rod 108 located within the guide pin. A shoulder 110 is defined adjacent the cylindrical surface such that upon axial displacement of the rod 108 the ball may be located within the confines of the pin and, hence, the plates may be completely separated. It will be noted that the hole 103 is constructed to prevent the ball from becoming separated from the guide pin. The rod 108 is continually biased in a direction engaging the surface 106 with the ball 104 by a spring 112 acting upon a screw 114 and a shoulder defined in the guiding pin. Thus, the ball 104 may only be retracted into the guide pin upon the operator depressing the screw 114 and aligning the recess adjacent the shoulder 110 with the ball.

An abutment member 116 is located upon the lower plate member having a shoulder 118 which coacts with the locating pin 20 mounted on the pot legs 14 and the purpose of these components is to prevent the lower plate 30 from excessively pivoting relative to the pot upon complete separation of the upper plate member from the connecting rods 36 during loading of a large nut.

As shown in FIG. 10, the plate members are capable of being opened and pivoted through a considerable degree to accommodate various size hexagonal configurations and the position of the drive screws 18 within the elongated slots will vary according to the size of the nut being clamped between the plates.

It will, therefore, be appreciated that the invention describes a chuck wherein a pair of plates are relatively translated in parallel relation and wherein the forces imposed upon the plates to clamp a member therebetween will be uniform and accurately distributed whereby each connecting rod will have the same tension placed therein. In that a single cam bar produces the locking forces within each connecting rod the uniform distribution of locking forces is insured.

It is appreciated that other embodiments of the invention may be apparent to those skilled in the art without departing from the spirit and scope thereof and it is intended that the invention be defined only by the scope of the following claims.

I claim:

1. In a chuck, a pair of parallel plate members interconnected by a pair of spaced parallel, linear connecting rods, a pair of intersecting, angularly disposed jaw surfaces defined on opposed portions of each plate intermediate said connecting rods, said jaw surfaces disposed equal distances about a point intermediate said plates, the surfaces diametrically opposed relative to said point being parallel, mounting and driving means defined on each of said plates on the opposite side of one of said rods with respect to the jaw surfaces of the associated plate and cam means mounted on one of said plates operatively associated with said connecting rods selectively adjusting and locking said plates in spaced relationship.

2. In a chuck as in claim 1 wherein teeth are defined on said connecting rods, said rods are fixed within one of said plates and slidably received within guideways defined in the other plate, said cam means comprises a toothed member having teeth selectively simultaneously cooperating with the teeth of said rods, means supporting said cam means for linear movement on said other plate in a direction angularly related to the axis of said rods and means moving said toothed cam member while engaging the teeth of said rods translating said plates toward each other.

3. In a rotated chuck for chucking hexagonal configurations, a pair of interconnected plate members, a pair of parallel, linear connecting rods affixed to one of said plates and extending therefrom, a pair of parallel guideways formed in the other plate slidably receiving said rods, a pair of intersecting jaw surfaces defined on each of said plates on opposed portions thereof intermediate said rods and guideways defining an included angle of 120°, teeth defined on said rods angularly disposed to the axis thereof, a cam bar slidably mounted on said other plate for movement in a direction angularly disposed to the axis of said rods and having teeth operatively associating with the teeth defined on said rods, chuck mounting means defined at one location on each of said plates remote from said jaw surfaces on the relative opposite side of said connecting rods and guideways, said chuck mounting means of each plate being located on said plate whereby a line interconnecting a mounting means and the remote interconnected portion of the associated plate and a connecting rod is substantially parallel to one of the associated jaw surfaces.

4. In a chuck as in claim 3 wherein said plate mounting means comprises an elongated slot having a major axis and receiving a drive pin, said slot being located such that the extension of the major axis thereof approximately passes through the intersection of the jaw surfaces of the associated plate.

5. In a chuck for chucking hexagonal configurations, a pair of interconnected plate members, a pair of parallel linear connecting rods affixed to one of said plates and extending therefrom, a pair of parallel guideways formed in the other plate slidably receiving said rods, a pair of intersecting jaw surfaces defined on each of said plates on opposed portions thereof intermediate said rods and guideways defining an included angle of 120°, teeth defined on said rods angularly disposed to the axes thereof, an elongated cam bar slidably mounted on said other plate for movement in a direction angularly disposed to the axis of said rods, teeth defined on said cam bar operably associable with the connecting rod teeth, means translating said cam bar toward and away from said connecting rods respectively engaging and disengaging the teeth thereof and cam bar actuating means longitudinally sliding said bar upon said other plate during engagement of said rod and bar teeth.

6. In a chuck as in claim 5 wherein said cam bar actuating means comprises an elongated actuating element longitudinally slidably mounted upon said other plate adjacent and parallel to said cam bar and lost motion connection means interconnecting said cam bar and elongated actuating element.

7. In a chuck as in claim 6 wherein a rack is affixed to said actuating element and a gear having a handle is rotatably journaled on said other plate in mesh with said rack.

8. In a chuck as in claim 6 wherein said means translating said cam bar toward said connecting rods comprises cam projections mounted on said cam bar engageable with said actuating element, recesses defined in said actuating element selectively alignable and receiving said cam projections and said means translating said cam bar away from said connecting rods comprises cam projections affixed to said other plate operatively associated with cam surfaces defined on said cam bar.

References Cited in the file of this patent

UNITED STATES PATENTS

| | | |
|---|---|---|
| 2,437,200 | Kuppersmith | Mar. 2, 1948 |
| 2,608,892 | Bennert | Sept. 2, 1952 |
| 2,812,567 | Zalkind | Nov. 12, 1957 |
| 2,940,764 | Krantz | June 14, 1960 |